United States Patent [19]
Wotton et al.

[11] Patent Number: 5,050,492
[45] Date of Patent: Sep. 24, 1991

[54] CHERRY SPLITTER

[75] Inventors: Phillip J. Wotton; Glynn F. Liebelt, both of Carey Gully; Robert G. Washington, Upper Sturt, all of Australia

[73] Assignee: Belt-Ton Grading Pty. Ltd., Carey Gully, Australia

[21] Appl. No.: 593,079

[22] Filed: Oct. 5, 1990

[30] Foreign Application Priority Data

Oct. 10, 1989 [AU] Australia .............................. PJ6775

[51] Int. Cl.⁵ .................... A23N 15/02; A23N 15/00
[52] U.S. Cl. ...................................... 99/638; 99/537; 99/642; 99/643; 460/125
[58] Field of Search ................ 99/537, 538, 546, 635, 99/636, 637, 638, 639, 641, 642, 643, 646 R; 83/875, 155, 568, 602; 209/620, 621; 460/125, 127

[56] References Cited

U.S. PATENT DOCUMENTS

| 136,216 | 2/1873 | Current | 83/875 |
|---|---|---|---|
| 2,825,375 | 3/1958 | Gotelli et al. | 460/125 |
| 2,920,389 | 1/1960 | Nuami | 99/537 |
| 3,065,777 | 11/1962 | Allen et al. | 99/537 |
| 3,115,169 | 12/1963 | Rodriquez et al. | 99/638 |
| 3,115,170 | 12/1963 | Rodriquez et al. | 460/125 |
| 3,194,243 | 7/1965 | Cota | 460/125 |
| 3,734,004 | 5/1973 | Losito | 99/637 |
| 4,687,064 | 8/1987 | Johnson | 460/127 |
| 4,784,057 | 11/1988 | Mietzel | 99/638 |

Primary Examiner—Timothy F. Simone
Attorney, Agent, or Firm—Rodman & Rodman

[57] ABSTRACT

Cherries are transported by an array of side-by-side belts which are driven past cutters aligned with respective separating guides, each of which separates the cherries of a bunch before the bunch reaches a cutter, and locates the cherries on opposite sides of the cutter. The cutter can cooperate with an anvil to support the stalks while the stalks are separated by the cutter, usually at a node.

11 Claims, 6 Drawing Sheets

CHERRY SPLITTER

This invention relates to a machine which is useful for separating the cherries of a bunch into individual cherries by separating their stalks.

BACKGROUND OF THE INVENTION

It is necessary in some marketing areas to market cherries which are graded for size, in turn requiring marketing as individual cherries depending from separate stalks, but as cherries exist in a bunch, they are usually two cherries, often of different size, joined together by their stalks which are connected by nodes.

Attempts which have been made previously to mechanically split the cherries so that the stalk of each cherry is separated from any other cherry at or near the node, have as far as is known, been generally unsuccessful in that the cherries are damaged by the equipment and some loss occurs. The alternative of severing the cherry stems at indeterminate points along their lengths has a deleterious effect upon the cherries, which quickly deteriorate if the stalks are short. The main object of this invention is to provide a machine which is capable of splitting most if not all of the cherries from one another at or near their nodes and thereby produce a more marketable product.

In order to achieve correct mechanical splitting near the node points, all, or nearly all, the cherries must be correctly oriented, but cherries tend to tangle, and must be untangled to effect the required orientation. Another object of the invention is to provide a machine which is capable of untangling cherries and orienting them correctly for splitting.

Our co-pending, Australian Patent Application 23728/88 (U.S. Pat. No. 4,892,650) relates to a device designed primarily for grading of strawberries. The machine of this invention can be an accessory to the machine of the aforesaid Patent in that the cherries split by this invention can subsequently be graded by a grading machine as described therein.

BRIEF SUMMARY OF THE INVENTION

In this invention, cherries are transported by an array of side-by-side belts which are driven past cutters aligned with respective separating guides, each of which separates the cherries of a bunch before the bunch reaches a cutter, and locates the cherries on opposite sides of the cutter. The cutter can co-operate with an anvil to support the stalks while the stalks are separated by the cutter, usually at a node.

With the invention, the cutter, if discoid in shape, can have a circular knife edge, it can have sharpened teeth, it can be of abrasive material or it can be elongate, as a chain cutter. The anvil surface may be a surface of the guide, or separate abutment surfaces flanking the cutter near the upper part of its traverse.

In the preferred arrangement the cutter is a toothed cutter, the teeth being so inclined to radial directions that they carry the cherries up one each side of each cutter and sever the cherries at the node points where the cutters traverse the anvil.

More specifically, the invention consists of a cherry splitting machine comprising:

a frame, a plurality of belt upper portions lying side by side and extending between pulleys carried on shafts journalled in bearings which are fast with respect to the frame, a plurality of cutter assemblies, each cutter assembly comprising a cutter lying between adjacent said belts with at least portion of the cutter upstanding above said belts, drive means coupled to the belts and the cutters and operable to effect relative movement therebetween, and at least one separator located between belts upstream of and aligned with each respective said cutter, the shape and location of each said separator being such as to divide the cherries of a bunch when being transported by the belts when driven by said drive means towards the cutters, in turn locating said cherries of the bunch on opposite sides of a said cutter, the shape of each said cutter being effective in separating stalks of cherries when on said opposite sides of the cutter.

BRIEF DESCRIPTION OF THE DRAWINGS

Embodiments of the invention are described hereunder in some detail with reference to, and are illustrated in, the accompanying drawings, in which.

Figure 1:
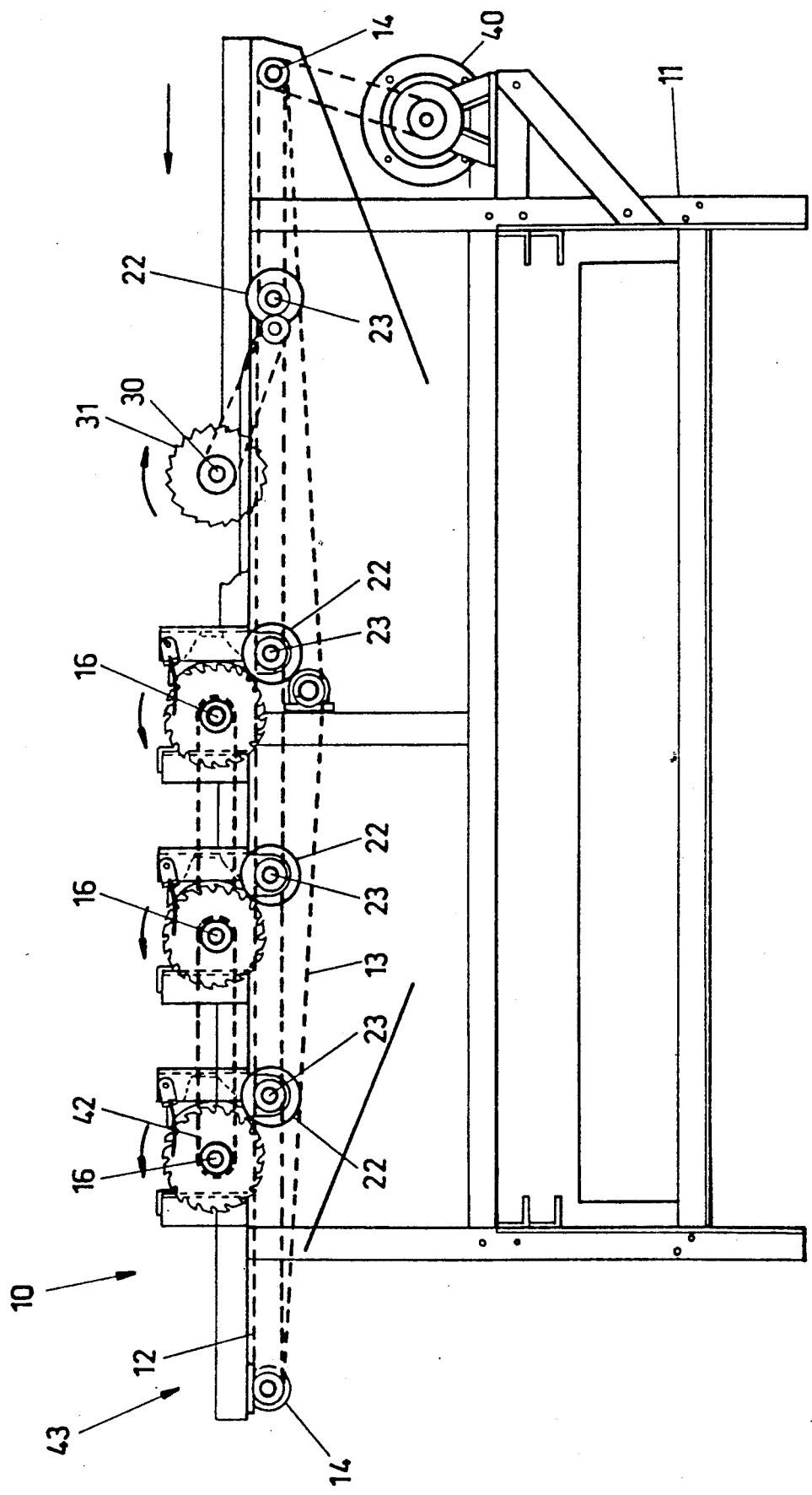
FIG. 1 is a diagrammatic side elevation of a machine according to a first and preferred embodiment.
Figure 2:
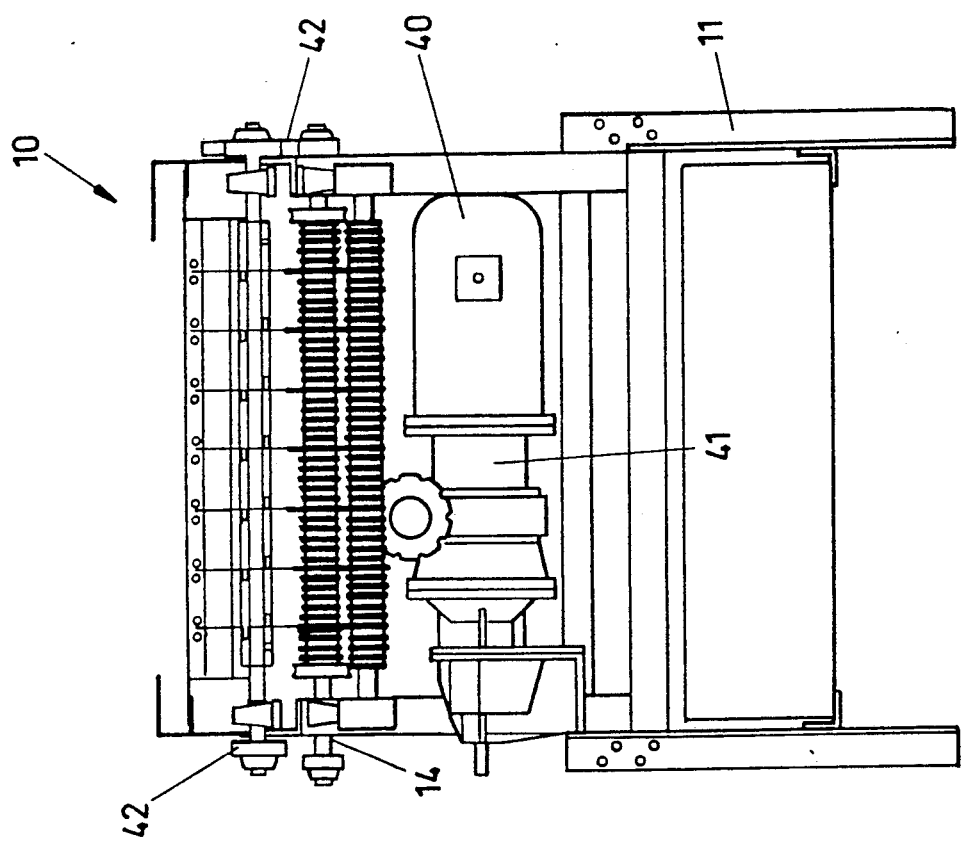
FIG. 2 is an end elevation of FIG. 1.
Figure 3:
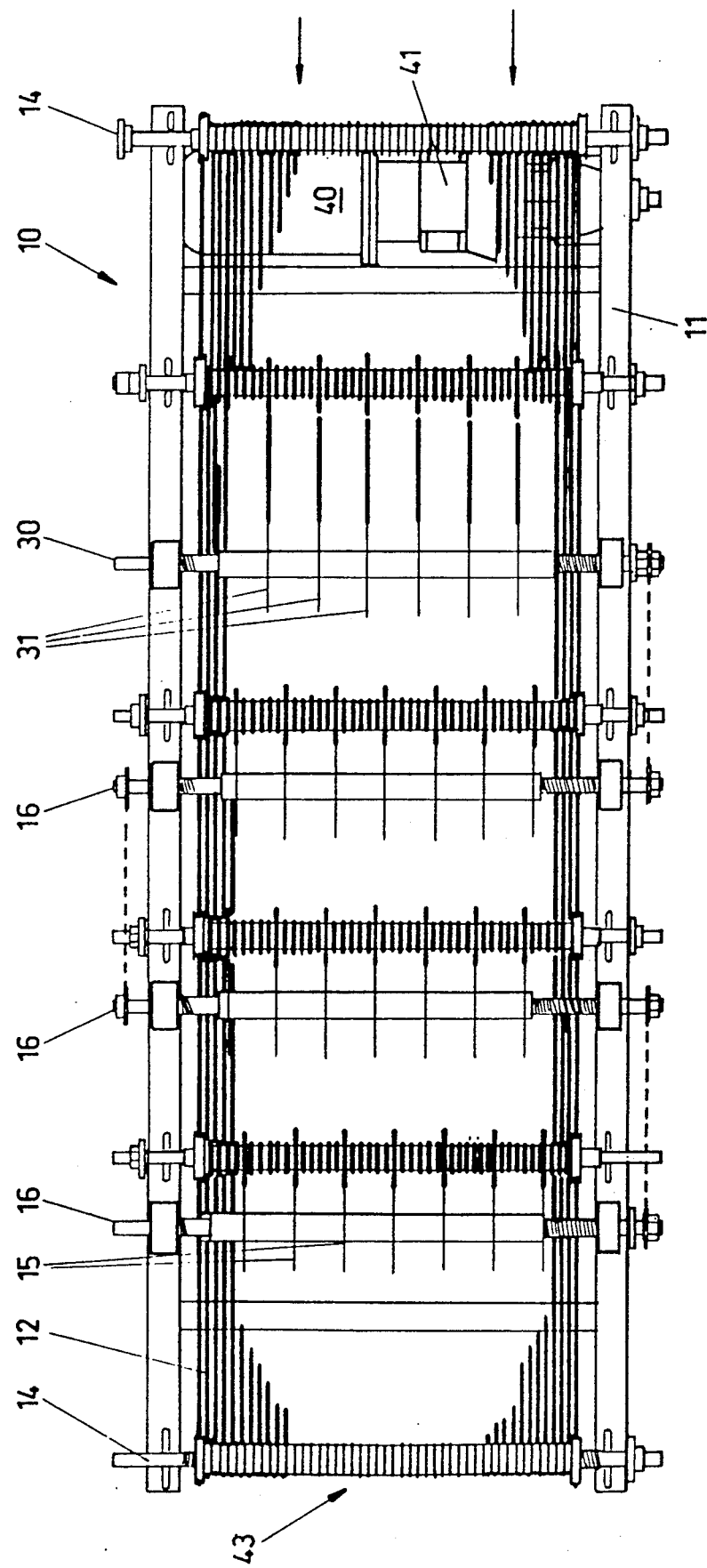
FIG. 3 is a plan of Fig 1.

In this embodiment, a cherry splitter 10 comprises a frame 11, and at the input end of the frame there is provided a sloping tray (not shown) which feeds cherries onto a table comprising a plurality of parallel moving belt portions 12 of a continuous belt which has only one join in it, this being achieved by a crossover belt portion 13 beneath the belt portions 12.

The belt 12 comprises a soft and flexible resilient polyurethane tubing of circular shape, and by utilising a single length the forces imposed against the bearings of the end shafts 14 are substantially reduced, and the possibility of malfunction due to the existence of the plurality of joints is also substantially reduced.

A plurality of discoid cutters 15 are arranged in a staggered array, there being a plurality of cutters on each of the three threaded parallel transverse shafts 16 which are spaced from one another. Each discoid utter 15 is somewhat similar in shape to a small diameter wood cutting rotary saw blade, having recesses in its periphery which are inclined with respect to the radial direction to form teeth 17. Each cutter 15 co-operates, and lies between, a pair of spaced anvil blocks 18 (FIGS. 4 and 5) carried on transverse frame members 19. These are not illustrated in Figs 1, 2, 3 or 5. The locations of the cutters 15 on the shaft 16 can be adjusted by nuts which threadably engage the shaft 16.

Figure 4:
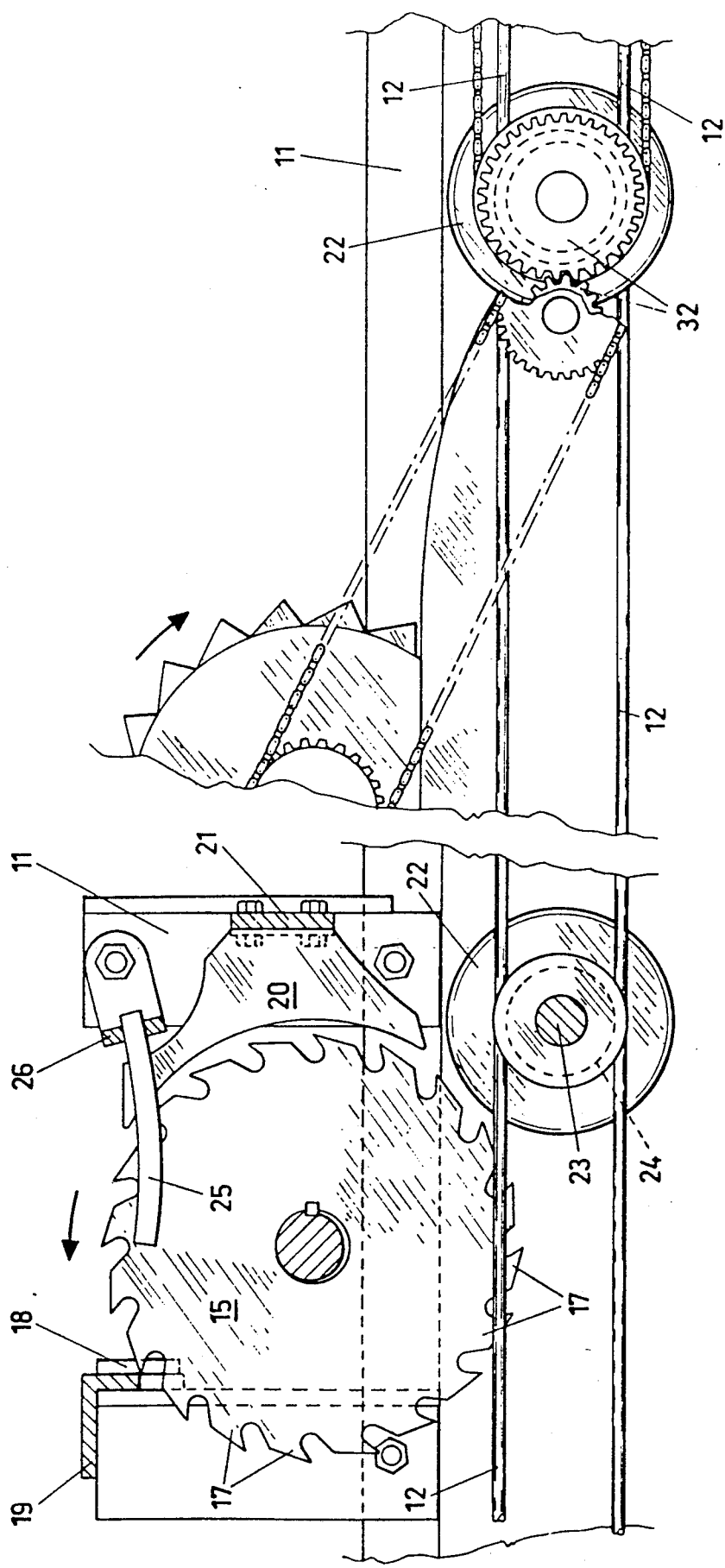
FIG. 4 is a part side elevation, illustrating two alternative cutting wheel shafts, guide means and anvil, drawn to a larger scale.
Figure 5:
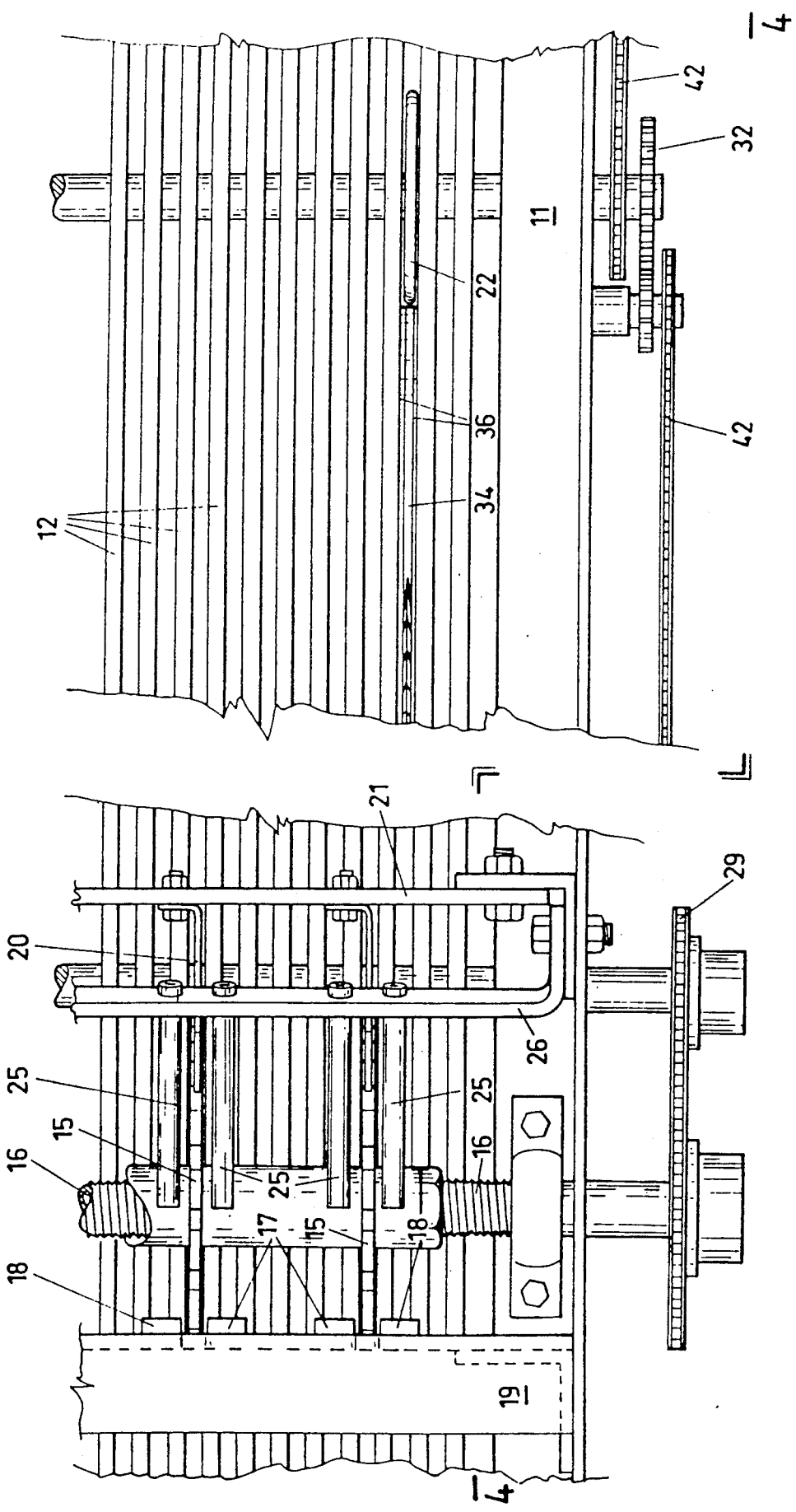
FIG. 5 is a part plan of FIG. 1.

The cherries as discharged onto the belt portions 12 from the tray are completely random and it is necessary therefore for them to be separated from one another as they approach the cutters 15, and to achieve this there is provided a combination of a plurality of smooth wall divider plates 20 which extend vertically upwardly, which are carried by further transverse frame members 21, and these overlie and co-operate with relatively large diameter separator discs 22 which are adjacent the respective cutters 15 as seen best in FIGS. 4 and 5. These discs 22 are carried on transverse disc shafts 23 which also carry on them the rollers 24 which guide the belt portions 12.

Notwithstanding the ability of the plates 19 and separating discs 21 to separate the cherries of any one dual bunch of cherries, it is still possible for the teeth 17 of the discoid cutters 15 to pick the dual bunch up and transport it towards the anvil blocks 17 in an asymmetrical manner, and to inhibit this there are provided pairs of soft resilient fingers 25 located one each side of each cutter blade 15, the fingers 25 being carried by a transverse frame member 26, bolted at its ends to frame 11, and capable of being tilted about the bolts for adjustment purposes.

The aforesaid cutter shafts 16 with their cutters 15 were at stages 2, 3 and 4 of the cherry splitting operation, wherein the cutter teeth picked up the nodes of the cherry stalks and transported them upwardly and forwardly to the anvil blocks 18.

Figure 6:
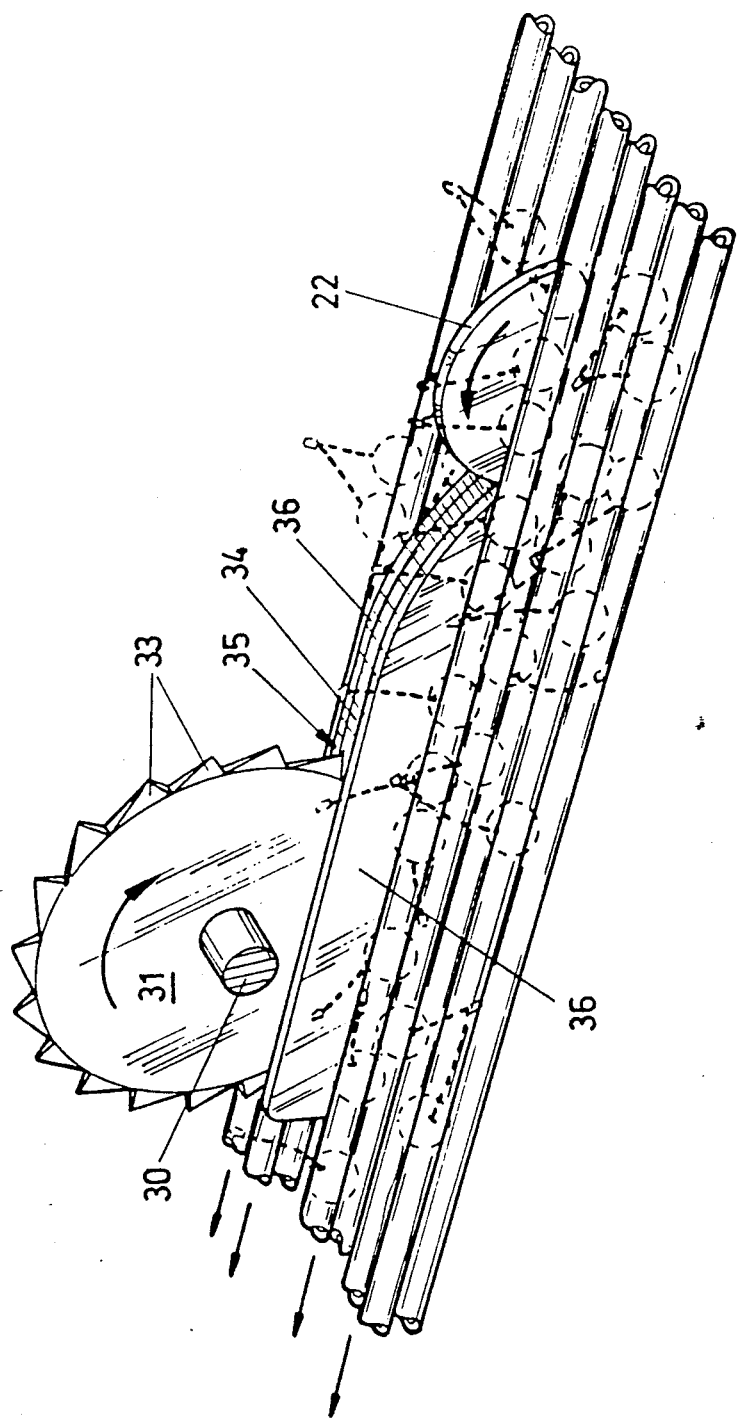
FIG. 6 is a diagrammatic perspeotive illustration which shows the first station operation of FIG. 1, and illustrates the manner in which clusters of cherries are untangled and separated.

However it is sometimes desirable to sever the nodes in a slightly different manner, as shown in FIG. 6. When cherries are first placed on the moving belts 10, they are transported as a mass, each cherry assisting, and being assisted by, its assisted by, its neighbours to move with the belts. It is possible, and in some instances desirable, for a cutter disc to rotate in a direction opposite to belt movement, and in this embodiment the first stage of operation utilises a shaft 30 carrying cutters 31 in an antiolockwise direction (FIGS. 4 and 5). The reverse rotation is effected by gears 32, and a supplementary chain drive 33.

The periphery of each cutter 31 is tapered from both sides to a sharp circular edge, and the cutter teeth 33 formed to triangular shapes, and anvil plate 34 terminates at its downstream end in a V groove 35 to provide the required cutter configuration. The leading edge of plate 34 is curved downwardly towards separating disc 22 as shown in FIG. 6, and the cutter 31 and plate 34 are flanked by divider side plates 36 to limit damage to the cherries traversing the first stage. As in stages 2, 3 and 4, rotating disc 22 separates cherries of a cluster before they reach the plates 34 and 36, and most, sometimes all, cherries are oriented as shown in FIG. 6 before the nodes are severed by the teeth 33. Obviously however, the arrangement of FIG. 6 can be used for all stages, or the arrangement of the above described second, third and fourth stages can alternatively be used for all stages.

Drive is effected by a single drive motor 40 provided with a gear box 41 which drives all shafts 14, 16 and 23 by chain and sprocket drive means 42, and it can be seen from FIG. 4 that the peripheral speed of separating discs 22 exceeds the translational speed of belt portions 12, and the peripheral speed of cutters 15 exceeds that of discs 22.

Experiments have established that the device according to this invention is capable of separating a large percentage of the cherries which are randomly placed onto the belt portions 12, and only a very small number of cherries which are transported to the discharge end 43 of the splitter 10 will have dual stalks. The discharged cherries can be directed onto the entry end of a device constructed in accordance with the aforesaid Australian Patent Application 23728/88 (U.S. Pat. No. 4,892,650) for accurate grading.

Although there were many difficulties to be overcome in developing the invention described herein, it has nevertheless resulted in a simple but effective cherry splitting arrangement.

We claim:

1. A cherry splitting machine comprising:
   a frame,
   a plurality of belt upper portions lying side by side and extending between pulleys carried on shafts journalled in bearings which are fast with respect to the frame,
   a plurality of cutter assemblies each cutter assembly comprising a cutter lying between adjacent said belts with at least portion of the cutter upstanding above said belts,
   drive means coupled to the belts and the cutters and operable to effect relative movement therebetween,
   and at least one separator located between belts upstream of and aligned with each respective said cutter,
   the shape and location of each said separator being such as to divide the cherries of a bunch when being transported by the belts when driven by said drive means towards the cutters, in turn locating said cherries of the bunch on opposite sides of a said cutter, the shape of each said cutter being effective in separating stalks of cherries when on said opposite sides of the cutter.

2. A cherry splitting machine according to claim 1 wherein each said cutter is of discoid shape and comprises circumferentially spaced teeth, the cutter assemblies further comprising anvils adjacent to and co-operable with respective said cutters, said drive means rotationally driving said cutters the teeth of which engage nodes of cherries being split and sever the stalks against the anvils.

3. A cherry splitting machine according to claim 1 wherein said separators comprise discoid separator wheels having upper portions projecting upwardly from between adjacent said belts, and wheel drive means drive said wheels with their said upwardly projecting portions moving in the same direction as said belts.

4. A cherry splitting machine according to claim 1 wherein the belt of each said belt portion comprises soft and flexible resilient tube, and comprises a single length having a cross-over portion beneath said belt upper portions.

5. A cherry splitting machine according to claim 1 wherein said at least one separator comprises smooth wall separator discs and each said cutter is of discoid shape and comprises circumferentially spaced teeth, both the cutters and the separator discs having upwardly extending portions which extend upwardly from between adjacent said belts,
   and comprising a cutter shaft and a separator disc shaft parallel to the cutter shaft, both said shafts being transverse to a direction of travel of said belt upper portions, a plurality of cutters on the cutter shaft and a plurality of separator discs on the separator disc shaft longitudinally aligned with respective said cutters, said drive means being coupled to said shafts to drive said shafts in the same direction,
   each said cutter assembly comprising anvil blocks fast with respect to the frame and located adjacent said cutters,
   said belts, separators, cutters, and anvil blocks being in an configuration whereby, in use, said belts transport cherries past the separators which separate cherries of clusters of cherries to lie adjacent opposite sides of the separators and said cutter teeth pick up the nodes of stalks of the thus separated cherries and sever them against the anvil blocks.

6. A cherry splitting machine according to claim 5 wherein said frame comprises a main frame and a transverse frame member located above said belts, and a plurality of pairs of fingers of soft and resilient material, the fingers of each pair projecting from the transverse frame member and being located one each side of a respective said cutter, and adjustment means between the main frame and transverse frame member effective in adjusting relative positions of the fingers and cutters.

7. A cherry splitting machine according to claim 5 wherein said separator disc shaft is located beloW said belt upper portions and comprises a plurality of grooved rollers between adjacent said separator discs, the roller grooves being annular and engaged by said belt upper portions.

8. A cherry splitting machine according to claim 5 wherein said cutter shaft is located above said belt upper portions, and has a thread intermediate its ends engaged by nuts, by which the locations of the cutters are adjustable.

9. A cherry splitting machine according to claim 5 wherein said at least one separator further comprises divider plates which extend upwardly from respective said separator discs and lie adjacent portions of said cutters.

10. A cherry splitting machine according to claim 1 wherein each said at least one separator comprises smooth wall separator discs and each said cutter is of discoid shape and comprises circumferentially spaced teeth, both the cutters and the separator discs having upwardly extending portions which extend upwardly from between adjacent said belts, and comprising a cutter shaft and a separator disc shaft parallel to the cutter shaft, both said shafts being transverse to a direction of belt travel, a plurality of cutters on the cutter shaft and a plurality of separator discs on the separator disc shaft longitudinally aligned with respective said cutters, said drive means being coupled to said shafts to drive said shafts in opposite directions, each said cutter assembly comprising an anvil plate fast with respect to the frame, each anvil plate extending longitudinally between a said separator disc and cutter and having an end adjacent said cutter, said belts, separators, cutters and anvil plates being in a configuration whereby, in use, said belts transport cherries past the separators which separate cherries of clusters of cherries to lie adjacent sides of the separators, transport the thus separated cherries past the anvil plates with stalks straddling the anvil plates, and the cutter blade teeth sever the stalks against the anvil plates.

11. A cherry splitting machine according to claim 10 wherein said at least one separator comprises divider side plates which extend from each respective said separator disc in the direction of belt travel and flank both the anvil plate and aligned cutter of said cutter assembly.

* * * * *